# United States Patent Office 2,926,998
Patented Mar. 1, 1960

2,926,998

PRODUCTION OF MONOPERSULFURIC ACID

Alfred A. D'Addieco, Grand Island, N.Y., and Stephen E. Stephanou, Santa Ana, Calif., assignors to E. I. du Pont de Nemours and Company, Wilmington, Del., a corporation of Delaware No Drawing. Application May 15, 1957
Serial No. 659,212

9 Claims. (Cl. 23—166)

This invention relates to the production of monopersulfuric acid by the reaction of hydrogen peroxide and oleum.

This application is a continuation-in-part of copending application Serial No. 549,629, filed November 29, 1955.

Monopersulfuric acid ($H_2SO_5$) has been prepared by various methods, e.g., by the hydrolysis of persulfuric acid ($H_2S_2O_8$), by the reaction of persulfates with sulfuric acid, and by the reaction of hydrogen peroxide with sulfuric acid or 30% oleum. Most prior methods have yielded the acid in dilute form intended for immediate use. So far as we are aware, concentrated (at least 30%) solutions of monopersulfuric acid have not hitherto been used in industry, possibly because no practical method has been available for their manufacture, particularly from concentrated oleum and concentrated hydrogen peroxide. Concentrated solutions of monopersulfuric acid are useful and desirable for various purposes particularly in the preparation of solid monopersulfate products.

It is an object of the invention to provide a practical and efficient method for preparing concentrated monopersulfuric acid solutions from hydrogen peroxide and oleum as reactants. A specific object is a method of preparing monopersulfuric acid employing concentrated hydrogen peroxide and concentrated oleum as reactants in proportions found to be critical to the obtainment of efficient conversions of the hydrogen peroxide to monopersulfuric acid. Still further objects will be apparent from the following description.

The objects of the invention are accomplished by mixing hydrogen peroxide of at least 50% strength (i.e., at least 50% $H_2O_2$ by weight) and oleum of 53 to 82% strength (i.e. containing 53 to 82% free or dissolved $SO_3$ by weight) in proportions within a range found to be critical for the obtainment of efficient conversion of the hydrogen peroxide to monopersulfuric acid. The mole ratio of oleum to hydrogen peroxide should be within the range 1.1 to 3.1, most preferably 1.3 to 2.7, moles of oleum per mole of hydrogen peroxide.

The term "moles of oleum" is used herein to mean the sum of the number of moles of free or dissolved $SO_3$ and the number of moles of sulfuric acid present in the amount of oleum employed.

Dilute (e.g., 30%) oleum has been proposed heretofore for reactions with hydrogen peroxide to produce dilute solutions of monopersulfuric acid. The present invention contemplates the use of oleum of 53 to 82% strength, most preferably 57 to 74%. Oleums of such strengths are liquid at those temperatures suitable for carrying out the monopersulfuric acid reaction and can be readily, rapidly and efficiently reacted with hydrogen peroxide in accordance with the invention. Oleums of higher (e.g. 90%) and somewhat lower (e.g. 45%) strengths are solid at the desired reaction temperatures and therefore difficult to handle and cannot be efficiently mixed and reacted with hydrogen peroxide to obtain the desired product in good conversions. At preferred reaction temperatures not exceeding 15° C., oleum of strengths ranging from 57 to 74% should be used, since oleum of higher or lower strength is not liquid at 15° C. Similarly, at 10° C., oleum of 58 to 71% strength should be used. In any case, the oleum chosen for use should be of such a composition that it will be liquid at the reaction temperature to be used.

It has been discovered that when employing oleum of 53 to 82% strength and hydrogen peroxide of at least 50% strength as reactants, high conversions (at least 82%) of the active oxygen present in the reaction mixture to monopersulfuric acid requires the use of at least 1.1 but not more than 3.1 moles of oleum ($SO_3+H_2SO_4$) per mole of $H_2O_2$. The conversion drops off rapidly if the mole ratio of oleum to $H_2O_2$ is either less than 1.1:1 or greater than 3.1:1. The preferred proportions range from 1.3 to 2.7 moles of oleum per mole of $H_2O_2$, in which range conversions upwards of 90% have been realized. Such high reactions efficiencies are remarkable in view of the well-known relative instability of peroxygen compounds and the high heats of reactions involved when using concentrated reactants.

The hydrogen peroxide reactants should be at least 50% strength and most preferably will be of 65 to 90% strength, otherwise the product monopersulfuric acid becomes unduly diluted. A further advantage in using hydrogen peroxide of the above high strengths is that the heat of reaction of sulfur trioxide with water and the heat of dilution are thereby minimized, which in turn reduces the amount of cooling necessary.

Mixing of the oleum and peroxide reactants is preferably carried out at temperatures between the freezing point of the oleum used and about 15° C. (e.g., from about 0 to 15° C.), at which temperatures the reaction to form monopersulfuric acid occurs rapidly with efficient conversion to monopersulfuric acid. The most preferred temperatures range from about 3 to 10° C. Temperatures from 15° C. up to about 25° C. can be used, but with some sacrifice in active oxygen recoveries. Temperatures above about 25° C. are not recommended since they are conducive to poor efficiencies due to hydrolysis of monopersulfuric acid and losses of active oxygen.

Mixing of the reactants should be effected under efficient agitation and cooling. This can be accomplished, for example, by adding the oleum at a controlled rate to the hydrogen peroxide maintained under agitation and cooling. Alternatively, both reactants may be added simultaneously and separately at rates controlled to provide the proper proportions of the reactants to an agitated cooled portion of a reaction mixture. Another method is to flow the reactants separately and continuously at suitable rates into a cooled pipeline type reactor wherein they are continuously mixed by turbulent flow and reacted as the mixture passes through the reactor.

The invention is illustrated by the following examples in which all parts and concentrations are parts and percentages by weight, unless indicated to be otherwise.

EXAMPLE 1

To 34 parts (0.7 mole) of a cooled aqueous hydrogen peroxide solution of 70% strength provided with an efficient agitator, there were added 59.9 parts (0.7 mole) of 65% oleum during a period of 0.5 hour while maintaining the resulting mixture at a temperature between 0 and 8° C. Addition of the oleum was made from a burette whose delivery tip extended into the hydrogen peroxide solution. The reaction mixture was analyzed within 5 minutes to determine the distribution of active oxygen therein. This was accomplished by weighing 10 drops of the mixture in a cooled weighing bottle, adding the sample to 40 ml. of cold 1 N $H_2SO_4$ and analyzing for monopersulfuric acid ($H_2SO_5$), hydrogen peroxide and persulfuric acid ($H_2S_2O_8$) by essentially the method of Gleu (Oester, Newer Methods of Volumetric Analysis, page 109 (1938)). The mixture was found to contain 66.8% $H_2SO_5$, 5.5% $H_2O_2$ and no $H_2S_2O_8$. No loss of active oxygen resulted but the monopersulfuric acid represented only 78% of the active oxygen present.

The above procedure was repeated a number of times except that the mole proportions of oleum (65%) to hydrogen peroxide (70%) were varied over a considerable range. Results obtained are tabulated below along with those for Example 1.

Table of results

| Ex. | Moles of Oleum per Mole of $H_2O_2$ | Active Oxygen Recovered (Percent) | Reacted Mixture Contained | | | Conversion of Active Oxygen Recovered to $H_2SO_5$ (Percent) |
|---|---|---|---|---|---|---|
| | | | $H_2SO_5$ | (Percent) $H_2O_2$ | $H_2S_2O_8$ | |
| 1 | 1 | 100 | 66.8 | 5.5 | 0 | 78 |
| 2 | 1.1 | 92 | 62.0 | 2.0 | 4.7 | 87 |
| 3 | 1.2 | ------ | 62.0 | 3.7 | ------ | 87 |
| 4 | 1.4 | ------ | 62.4 | 1.2 | ------ | 94 |
| 5 | 2.7 | 96 | 37.6 | 0.3 | 4.7 | 91 |
| 6 | 3 | ¹82 | 32.4 | 0.8 | 4.9 | 85 |
| 7 | 5.8 | ¹84 | 7.6 | 2.7 | 1.9 | 44 |

¹ Active oxygen recovery somewhat low because temperature control was inadequate.

A curve obtained by plotting the mole ratios of the second column against the conversions of the last column of the above table shows that maximum conversion of recovered active oxygen to monopersulfuric acid is obtained at an oleum:$H_2O_2$ mole ratio of about 1.7:1. It also shows that conversions of at least 82% are realized at mole ratios ranging from 1.1:1 to 3.1:1, but that conversion drops off markedly when mole ratios of less than 1.1:1 or greater than 3.1:1 are used. The preferred ratios are in the range 1.3:1 to 2.7:1. When the reaction mixture is to be used to prepare solid monopersulfate products, the most preferred mole ratios of oleum:$H_2O_2$ range from 1.3:1 to 1.8:1 since the resulting monopersulfuric acid solutions contain the most suitable proportions of monopersulfuric acid and sulfuric acid for the recovery of stable solid monopersulfate compositions.

The present method has been successfully practiced many times to obtain directly monopersulfuric acid solutions containing from around 60 to 69% monopersulfuric acid by weight with upwards of 90% of the active oxygen present being in the form of the monopersulfuric acid.

We claim:
1. The method of producing monopersulfuric acid comprising mixing oleum containing from 53 to 82% dissolved $SO_3$ and hydrogen peroxide of at least 50% strength at a temperature between the freezing point of said oleum and about 25° C., in the proportion of from 1.1 to 3.1 moles of said oleum per mole of said hydrogen peroxide.

2. The method of claim 1 employing from 1.3 to 2.7 moles of oleum per mole of hydrogen peroxide.

3. The method of claim 1 employing 1.3 to 1.8 moles of oleum per mole of hydrogen peroxide.

4. The method of producing monopersulfuric acid comprising mixing oleum containing from 57 to 74% dissolved $SO_3$ and hydrogen peroxide of 65 to 90% strength at a temperature at which said oleum is liquid but not higher than about 15° C., in the proportions of from 1.1 to 3.1 moles of said oleum per mole of said hydrogen peroxide.

5. The method of claim 4 employing from 1.3 to 2.7 moles of oleum per mole of hydrogen peroxide.

6. The method of claim 4 employing from 1.3 to 1.8 moles of oleum per mole of hydrogen peroxide.

7. The method of producing monopersulfuric acid comprising mixing oleum containing about 65% dissolved $SO_3$ and hydrogen peroxide of 65 to 90% strength at a temperature between the melting point of said oleum and 15° C., in the proportions of from 1.1 to 3.1 moles of said oleum per mole of said hydrogen peroxide.

8. The method of claim 7 employing from 1.3 to 2.7 moles of oleum per mole of hydrogen peroxide.

9. The method of claim 7 employing from 1.3 to 1.8 moles of oleum per mole of hydrogen peroxide.

References Cited in the file of this patent
FOREIGN PATENTS
738,407    Great Britain _____ Oct. 12, 1955

OTHER REFERENCES
Jones, W. N.: "Inorganic Chemistry," Blakiston Co., 1947, page 419, lines 3 to 7.